Figure 1:
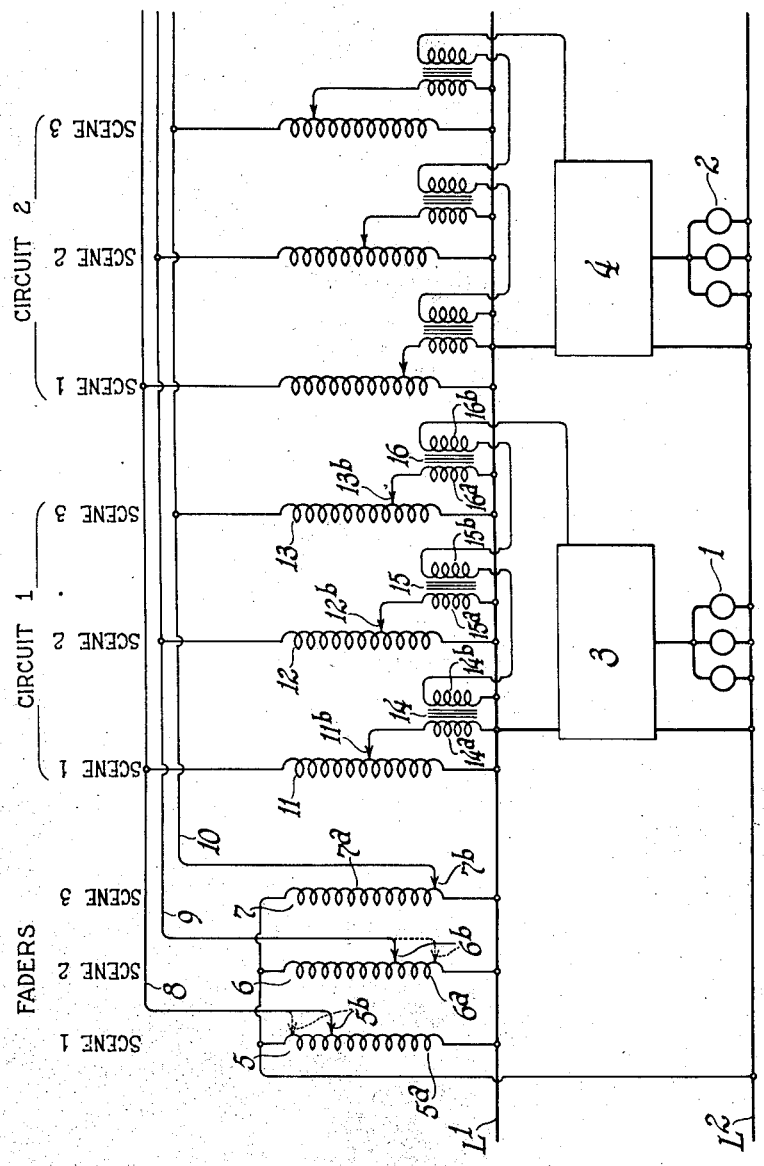

March 31, 1942. C. STANSBURY 2,278,222
CONTROL SYSTEM
Filed Dec. 7, 1940 2 Sheets-Sheet 1

Inventor
Carroll Stansbury
By Frank H. Hubbard
Attorney

March 31, 1942.   C. STANSBURY   2,278,222
CONTROL SYSTEM
Filed Dec. 7, 1940   2 Sheets-Sheet 2

Inventor
Carroll Stansbury
By Frank H. Hubbard
Attorney

Patented Mar. 31, 1942

2,278,222

UNITED STATES PATENT OFFICE 2,278,222

CONTROL SYSTEM

Carroll Stansbury, Wauwatosa, Wis., assignor to Cutler-Hammer, Inc., Milwaukee, Wis., a corporation of Delaware Application December 7, 1940, Serial No. 369,071

15 Claims. (Cl. 175—312)

This invention relates to improvements in control systems, and more particularly to illumination control systems comprising a plurality of lamp circuits with provision for presetting a plurality of intensities of illumination for each circuit and effecting simultaneously selective transition of all selected circuits from one preset intensity to another.

In accordance with the present invention each lamp circuit is provided with a plurality of scene controllers one for each scene to be preset, and the respective scene controllers for each scene of all the groups of lamps are in turn related to and controllable by a corresponding fader.

Systems providing for a plurality of scene presets with selection of a particular preset by one of a plurality of master controllers are old, but heretofore where more than two scene presets were provided for, it was necessary to employ complicated switching apparatus so as to select the proper faders and to provide for proper transition from one scene preset to another. In the present system the number of faders and corresponding lamp group masters which may be employed is unlimited, while the system provides for changing from one scene setup to any of the others by a simple manipulation of corresponding faders.

An object of the present invention is to provide a system of the aforementioned character which may employ any type of voltage regulators in the respective lamp circuits for the control of the illumination intensities of the latter.

Another and more specific object is to provide a system of the aforementioned character in which potentiometers are employed as faders, which potentiometers may be of either the resistor or reactor type.

Another object is to provide a system including a plurality of individual scene group sender controls each related to a corresponding lamp group and to a corresponding fader to provide for transition of the intensity of illumination of any lamp group from one preset value to another.

Another object is to provide a system of the aforementioned character wherein the controls of each of a plurality of lamp groups may be preset for a plurality of intensities, and wherein the effect of such controls may be shifted from one to another, with a corresponding variation in illumination intensity of the respective lamp groups, by the operation of corresponding faders.

Other objects and advantages of the invention will hereinafter appear.

The accompanying drawings illustrate certain embodiments of the invention which will now be described, it being understood that the embodiments illustrated are susceptible of modification without departing from the spirit and scope of the appended claims.

In the drawings, Figure 1 is a circuit diagram of a system constructed in accordance with my invention.

Figure 2:
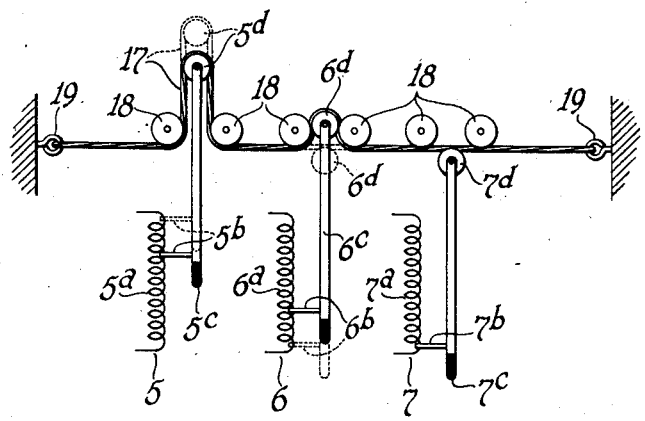
Figure 3:
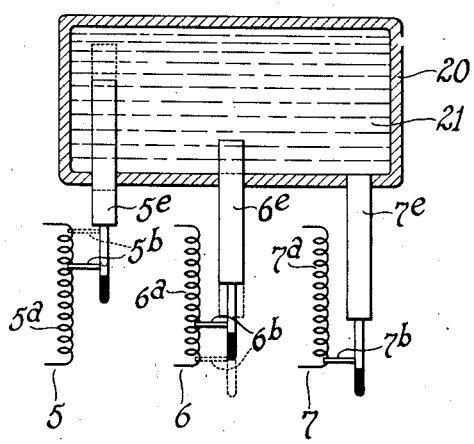

Fig. 2 is a schematic and diagrammatic illustration of one form of mechanism for effecting operation of the scene faders of the system shown in Fig. 1; and Fig. 3 illustrates a modified form of operating mechanism wherein an hydraulic interlock is employed.

Referring to the diagram Fig. 1, the same illustrates a system comprising two lamp circuits 1 and 2, the intensities of illumination of which are controlled by controllers 3 and 4, respectively, which may be of any suitable type; as for example, that shown in the application of Richard B. Hunter, filed June 22, 1939, Serial No. 280,448, and assigned to the assignee of the present application.

Each controller responds to the difference in output voltage between a sender potentiometer and a receiver potentiometer, one of the latter forming part of each of the controllers 3 and 4, respectively. Energy is supplied to the lamps and to the control circuits from the alternating current supply lines $L^1$ and $L^2$. The energy is supplied to the lamps by the controllers 3 and 4, respectively, in any desired manner; as for instance, in accordance with the aforementioned Hunter application.

The system further includes three fader control units 5, 6 and 7, respectively, each comprising a potentiometer type rheostat or autotransformer $5^a$, $6^a$ and $7^a$, respectively; each of the latter being connected across lines $L^1$ and $L^2$ and provided with sliding contacts or brushes $5^b$, $6^b$ and $7^b$, respectively. The aforementioned brushes are connected to bus bars 8, 9 and 10, respectively. Each lamp group or circuit is provided with three scene potentiometers corresponding to the three faders. The potentiometers for circuit 1, which potentiometers may be of the resistor or the autotransformer type, are designated by the numerals 11, 12 and 13, and are connected between line $L^1$ and bus bars 8, 9 and 10, respectively.

The potentiometers are provided with sliding brushes $11^b$, $12^b$ and $13^b$, respectively, by means of which the respective output voltages thereof can be adjusted. There are also provided three transformers 14, 15 and 16, one for each scene, having primary windings 14a, 15a and 16a, respectively, which are connected between line L¹ and the brushes 11b, 12b and 13b, respectively; and secondary windings 14b, 15b and 16b, respectively. The secondary windings 14b, 15b and 16b are connected in series with each other and in series with a control element of the lamp controller 3 across the lines L¹ and L². Depending upon the positions of the respective brushes 11b, 12b and 13b a voltage is impressed upon the control circuit of the lamp controller through the transformers 14, 15 and 16 which may be modified by the faders 5, 6 and 7, respectively. If one of the brushes 5b, 6b or 7b is moved to that end of the fader which is connected to line L², the full voltage of the supply circuit is impressed upon the corresponding preset potentiometer 11, 12 or 13; whereas if the respective brush 5b, 6b or 7b is shifted to that end of the respective fader potentiometer which is connected with line L², the voltage impressed upon the corresponding scene preset potentiometer is zero, and therefore the transformer 14, 15 or 16 is short-circuited so that no voltage is induced in its secondary winding and the lamp controller 3 is only under the influence of such transformer as has a voltage induced therein.

Circuit scene preset controllers similar to those described for the lamp group 1 are also provided for other groups which may be incorporated in the system, such as that designated as "Circuit 2." It is, of course, to be understood that the number of scene presets may be more than the three shown in the drawings.

Fig. 2 illustrates a mechanical arrangement whereby various fader potentiometers are interlocked in such a manner that any two of the same will cooperate in the proper manner. As shown in the drawings brushes 5b, 6b and 7b, respectively, are connected to actuating rods 5c, 6c and 7c, respectively, which may be guided and actuated in any suitable manner. One end of each rod 5c, 6c and 7c is provided with a roller 5d, 6d and 7d, respectively, over which passes a cord or band 17 which is guided over suitable additional rollers 18 and which has its ends attached to fixed supports 19 so as to be normally taut when one of the operating rods 5c, 6c or 7c is in its extreme bright position while all of the other rods are in their respective extreme dim positions.

The dotted lines in Fig. 2 show the rod 5c with its associated contact brush 5b in its extreme bright position, that is, the position corresponding to line potential impressed upon the bus bar 8, the operating rod 6c being shown in dotted lines in its extreme dim position, that is, a position corresponding to zero potential upon the bus bar 9. Rod 7c with its associated contact brush 7b is shown in full lines and is also in its extreme dim position.

If it is now desired to transfer the control from the preset for scene 1 to the preset for scene 2 the operating rod 6c is moved upwardly in the manner indicated in solid lines in Fig. 2 producing tension on the cord 17 which forces the operating rod 5c and its associated brush 5b downwardly, thus gradually increasing the potential upon bus bar 9 and correspondingly decreasing the potential impressed upon bus bar 8. In its full bright position the operating rod 6c is in the extreme upper position, while the operating rod 5c will then have been moved to its extreme lower or dim position. It will be observed that the upward movement of any fader effects a corresponding downward movement of any other fader which was previously in an upwardly extended position. Thus by the simple manipulation of the desired scene fader it is possible to transfer from one scene preset to another.

Fig. 3 shows a system similar to Fig. 2 except that the interlock between the faders is hydraulic instead of mechanical. The contact brushes 5b, 6b or 7b are attached to rams 5e, 6e or 7e, respectively, all of the rams being connected to a reservoir 20 which is completely filled with a substantially noncompressible liquid 21. As shown in dotted lines in Fig. 3, one of the rams 5e is in the full voltage or innermost position, while all of the other rams are in the zero voltage or outermost position, 6e being shown in dotted lines. If now it is desired to change from scene 1 to scene 2 the ram 6e associated with potentiometer 6 is moved inwardly. This inward movement of ram 6e causes the outward movement of the ram 5e in a manner corresponding to that described in connection with Fig. 2.

It is, of course, possible to employ any desired number of group potentiometers and faders with the systems herein illustrated and described. It is further possible to employ other mechanical or hydraulic means to operate the faders to produce the described coordination in their movement, or to modify the structural details of the specific means shown in Figs. 2 and 3.

If desired any suitable means (not shown in Figs. 2 and 3) may be provided to insure against upward movement of more than one of the contact brushes 5b, 6b or 7b at any one time. One simple expedient to provide this function would consist of a transversely slidable bottom cover plate having a single hand-hole or opening to provide access to one of the rods 5c, 6c or 7c, while simultaneously preventing access to any other of said rods.

Similarly, in respect of Fig. 2, suitable means may be provided to insure against downward movement of any one of the contact brushes 5b, 6b or 7b except as an incident to a corresponding degree of upward movement of another of said brushes.

I claim:

1. In an electrical control system comprising means for presetting a plurality of adjustable values in excess of two of an electrical quantity to be controlled, the combination of separate means for adjusting each of such values, a corresponding number of associated means providing for attainment of such adjustable values in sequence, an actuator for each of said last mentioned means selectively operable between two extreme positions, one of them being a normal position, and interlocking means for said actuators, providing, upon movement of one actuator toward said other extreme position, for biasing the other actuators toward said normal position in such a manner that the sum of the departures of all of the actuators from said normal position does not exceed the distance between said extreme positions.

2. In an electrical control system comprising means for presetting a plurality of adjustable values in excess of two of an electrical quantity to be controlled, the combination of separate means for adjusting each of such values, a corresponding number of associated means providing for attainment of such adjusted values in sequence, an actuator for each of said last mentioned means selectively operable between two extreme positions, one of them being a normal position, and interlocking means for said actuators, providing, upon movement of one actuator toward said other extreme position, for biasing another of said actuators toward said normal position, the arrangement being such that the sum of the degrees of departure of said two actuators from said normal position during such movement substantially corresponds to the distance between said extreme positions.

3. In an electrical control system comprising means for presetting a plurality of adjustable values in excess of two of an electrical quantity to be controlled, the combination of individual control means for adjusting each value, a corresponding number of associated means providing for attainment of such adjusted values in sequence, an actuator for each of said last mentioned means selectively operable between two extreme positions, one of them being a normal position, and motion transmitting means between said actuators, providing, upon movement of one actuator to said other extreme position, for movement of said other actuators to return them to said normal position.

4. In an electrical control system comprising means for presetting a plurality of adjustable values in excess of two of an electrical quantity to be controlled, the combination of individual control means for adjusting each value, a corresponding number of associated means providing for attainment of such adjusted values in sequence, an actuator for each of said last mentioned means selectively operable between two extreme positions, one of them being a normal position, and motion transmitting means between said actuators, providing, upon movement of one actuator in a given direction to said other extreme position, for movement of another of said actuators in the reverse direction to return it to said normal position.

5. In an illumination control system comprising means for presetting a plurality of scenes of illumination in excess of two, the combination of a fader for each scene, an actuator for each fader selectively operable between two extreme positions, one of them being a normal position, and interlocking means for said actuators, providing, upon movement of one actuator toward said other extreme position, for biasing the other actuators toward said normal position in such manner that the sum of the departures of all of the actuators from said normal position does not exceed the distance between said extreme positions.

6. In an illumination control system comprising means for presetting a plurality of scenes of illumination in excess of two, the combination of a fader for each scene, an actuator for each fader selectively operable between two extreme positions, one of them being a normal position, and interlocking means for said actuators, providing, upon movement of one actuator toward said other extreme position, for biasing another of said actuators toward its normal position, the arrangement being such that the sum of the linear degrees of departure of both of said actuators during such movement is at all times substantially equal to the distance between said extreme positions.

7. In an illumination control system comprising means for presetting a plurality, exceeding two in number, of scenes of illumination, the combination of a fader for each scene, an actuator for each fader, selectively operable between two extreme positions, one of them being a normal position, and motion transmitting means between said actuators, providing, upon movement of one actuator to said other extreme position, for movement of said other actuators to return them to said normal position.

8. An illumination intensity control system comprising, in combination, a corresponding number of potentiometer type elements for effecting presetting of a plurality, exceeding two in number, of scenes of illumination, a potentiometer type fader for each scene, an actuator element associated with each fader, each of said actuator elements being operable between two extreme positions, one of them being a normal position, and motion transmitting means common to all of said actuator elements and adapted upon movement of any one of the latter toward said other extreme position to effect a corresponding degree of movement of another of said actuators toward its said normal position.

9. In an illumination control system comprising means for presetting a plurality of scenes of illumination in excess of two, the combination of a fader for each scene, an actuator for each fader, selectively operable between two extreme positions, one of them being a normal position, and motion transmitting means between said actuators, providing, upon movement of one actuator to said other extreme position, for movement of said other actuators to return them to said normal position, in such manner that at all times the sum of the departures of all actuators away from said normal position does not exceed the distance between said two extreme positions.

10. In an illumination control system comprising means for presetting a plurality of scenes of illumination in excess of two, the combination of a fader for each scene, an actuator for each fader selectively operable between two extreme positions, one of them being a normal position, a flexible cord of constant length anchored at its ends, means attached to said actuators tending to tension said cord upon their movement from said normal position and simultaneously acting to urge other of the same toward said normal position by such tension of said cord.

11. An illumination control system comprising, in combination, means for presetting a plurality, exceeding two in number, of scenes of illumination, a fader for each scene, an actuator for each fader movable between two extreme positions, one of them being a normal position, a flexible member of constant length associated with said actuators and adapted to accommodate only one of the latter in its other extreme position when the other actuators are in their normal positions respectively, the arrangement being such that upon movement of one of said other actuators toward its other extreme position said first mentioned actuator will be automatically moved by said flexible member toward its said normal position.

12. In an illumination control system comprising means for presetting a plurality of scenes of illumination in excess of two, the combination of a fader for each scene, an actuator for each fader, selectively operable between two extreme positions one of them being a normal position, a reservoir adapted to receive a constant volume of a substantially incompressible liquid, a ram for each fader movable in opposite directions between two extreme positions to operate the fader, each ram cooperating with the liquid in said reservoir and adapted upon movement of the former into said reservoir to displace a portion of the liquid in said reservoir with consequent outward movement of another of said rams as an incident to the pressure of said liquid so produced, said inwardly moved ram being alternately adapted to be moved outwardly from said reservoir by pressure of said liquid as an incident to inward movement of another of said rams.

13. In an illumination intensity control system, in combination, a plurality of lamp circuits, means individual to each lamp circuit for presetting a plurality exceeding two in number, of intensities of illumination thereof, associated means operable to effect transition of all or any number of said lamp circuits jointly from each preset intensity of illumination thereof to another, said last mentioned means comprising a number of potentiometer type faders corresponding to the number of intensities of illumination to be preset, an actuator for each of said faders, each of said actuators being movable between two extreme positions, one of said actuators being initially located in its abnormal extreme position to render the same active and the other actuators being initially located in their normal extreme positions to render the same inactive, and interlocking means associated with said actuators and adapted upon movement of one of said inactive actuators toward its abnormal extreme or active position to simultaneously effect a corresponding degree of movement of said initially active actuator toward its normal extreme position to render the latter inactive, the arrangement being such that the sum of the distances of the aforementioned two actuators from the normal extreme positions thereof during such movement is at all times substantially equal to the distance between said extreme positions.

14. In an illumination intensity control system, in combination, a plurality of lamp circuits, means individual to each lamp circuit for presetting a plurality, exceeding two in number, of intensities of illumination thereof, associated means operable to effect transition of all or any number of said lamp circuits jointly from each preset intensity of illumination thereof to another, said last mentioned means comprising a number of potentiometer type faders corresponding to the number of intensities of illumination to be preset, an actuator for each of said faders, each of said actuators being movable between two extreme positions, one of said actuators being initially located in its abnormal extreme position to render the same active and the other actuators being initially located in their normal extreme positions to render the same inactive, interlocking means associated with said actuators and adapted upon movement of one of said inactive actuators toward its abnormal extreme or active position to simultaneously effect a corresponding degree of movement of said initially active actuator toward its normal extreme position to render the latter inactive, the arrangement being such that the sum of the distances of the aforementioned two actuators from the normal extreme positions thereof during such movement is at all times substantially equal to the distance between said extreme positions, and said interlocking means comprising a flexible member of constant length associated with said actuators and adapted to accommodate only one of the latter in its abnormal extreme position when the other actuators are in their normal extreme positions respectively, the arrangement being such that upon movement of one of said inactive actuators toward its abnormal extreme position the previously active actuator will be automatically moved to a corresponding degree by said flexible member toward its normal inactive position.

15. In an illumination intensity control system, in combination, a plurality of lamp circuits, means individual to each lamp circuit for presetting a plurality exceeding two in number, of intensities of illumination thereof, associated means operable to effect transition of all or any number of said lamp circuits jointly from each preset intensity of illumination thereof to another, said last mentioned means comprising a number of potentiometer type faders corresponding to the number of intensities of illumination to be preset, an actuator for each of said faders, each of said actuators being movable between two extreme positions, one of said actuators being initially located in its abnormal extreme position to render the same active and the other actuators being initially located in their normal extreme positions to render the same inactive, interlocking means associated with said actuators and adapted upon movement of one of said inactive actuators toward its abnormal extreme or active position to simultaneously effect a corresponding degree of movement of said initially active actuator toward its normal extreme position to render the latter inactive, the arrangement being such that the sum of the distances of the aforementioned two actuators from the normal extreme positions thereof during such movement is at all times substantially equal to the distance between said extreme positions, said interlocking means including a closed container, a ram associated with each of said actuators, said rams being movable between opposite extreme positions into and out of said container, a substantially incompressible liquid adapted to completely fill said container when one of said rams is in its inner extreme position within said container whereby its associated fader is rendered active, each ram cooperating with the liquid in said reservoir and adapted upon movement of the former into said reservoir to displace a portion of the liquid in said reservoir with consequent outward movement of another of said rams as an incident to the pressure of said liquid so produced, said inwardly moved ram being alternately adapted to be moved outwardly from said reservoir by pressure of said liquid as an incident to inward movement of another of said rams.

CARROLL STANSBURY.